United States Patent

Ogawa

[15] 3,694,629

[45] Sept. 26, 1972

[54] SYSTEM OF READING OUT INFORMATION UPON RECORDING MEDIUM IN OPTICAL INFORMATION READER

[72] Inventor: Mutsuo Ogawa, Tokyo, Japan

[73] Assignee: Kabushiki Kaisha Ricoh, Tokyo, Japan

[22] Filed: March 15, 1971

[21] Appl. No.: 124,280

[30] Foreign Application Priority Data

March 20, 1970 Japan ......................45/23826

[52] U.S. Cl.... 235/61.11 E, 340/146.3 AG, 250/219 D

[51] Int. Cl. ............................................G06k 7/10

[58] Field of Search ............340/146.3 AG, 146.3 H; 235/61.11 E, 61.11 D; 250/219 D, 219 DC; 179/100.2

[56] References Cited

OTHER PUBLICATIONS

Villante: " Automatic Threshold Control Circuit" IBM Tech. Discl. Bull' n., Vol. 5, No. 6, November 1962, pages 55 & 56

*Primary Examiner*—Thomas A. Robinson

*Attorney*—Burgess, Ryan and Wayne

[57] ABSTRACT

The outputs of a plurality of photoelectric effect elements arrayed so as to correspond to the marking positions in a column or row on a recording medium for detecting a marked or unmarked information are applied to a plurality of difference amplifiers through respective logarithmic amplifiers. To these difference amplifiers are applied a signal representative of the brightness upon the recording medium, this signal being selected from two or more than two outputs selected from the outputs of a plurality of logarithmic amplifiers so that the outputs from the difference amplifiers are not influenced by the brightness on the recording medium and accurately represent the marked or unmarked information of the marking positions on the recording medium.

3 Claims, 2 Drawing Figures

SYSTEM OF READING OUT INFORMATION UPON RECORDING MEDIUM IN OPTICAL INFORMATION READER

BACKGROUND OF THE INVENTION

The present invention generally relates to a system of reading out information recorded on a recording medium in an optical information reader, and more particularly to an improvement for a system of optically reading out information from a marked card or tape in a card or tape reader.

Optical card or tape readers are widely used as an input equipment for computer and in data processing. Generally, the optical card or tape readers comprise a light source, an optical system and a plurality of photoelectric effect elements, and the marking positions on a card or tape (to be referred to as "recording medium" hereinafter) is illuminated by the light source through the optical system. The light modulated by the marks upon the recording medium is intercepted by a plurality of photoelectric effect elements arrayed so as to correspond to the marking positions in the column or row on the recording medium through the optical system. The incident light is converted by the photoelectric effect elements into electrical signals representative of the marked or unmarked information of the marking positions. However, in the optical reader of the type described above, when the brightness of light from the light source is varied and/or the reflectivity or transmission factor of the recording medium is varied, incorrect reading of the marked or unmarked information tends to occur. In the prior art optical reader, to overcome this problem an additional photoelectric effect element for sensing the brightness of the surface of the recording medium is provided in addition to the photoelectric effect elements for sensing the marked or unmarked information so that the signals or outputs from the latter may be calibrated or compensated by the signal or output from the former or the photoelectric effect element for sensing the brightness of the surface of recording medium.

The modulated or non-modulated light representative of the marked or unmarked information of the marking position is incident upon the photoelectric effect element and is linearly converted into the electrical signal. The output of the photoelectric effect element is applied to a logarithmic amplifier whose output is logarithmically proportional to the output of the photoelectric effect element. The output from the photoelectric effect element for sensing the brightness of the surface of the recording medium is converted into a signal, the magnitude of which logarithmically represents the output of the photoelectric element through a logarithmic amplifier in the similar manner as described above. The outputs from the both of the logarithmic amplifiers are applied to a difference amplifier so that the influence due to the variation in brightness on the surface of the recording medium may be compensated, and the electrical signal representative of the presence or absence of the mark may be correctly obtained.

From the foregoing description, it is seen that the prior art optical reader must provide an additional photoelectric effect element for detecting the brightness of the surface of the recording medium in addition to a plurality of photoelectric effect elements for sensing the marked or unmarked information, so that the peripheral circuitry around the photoelectric effect elements is complicated. Furthermore, the photoelectric effect element for sensing the brightness of the surface of the recording medium generally senses only one portion or spot or the recording medium so that when this spot is contaminated, an erratic signal is picked up. As a consequence the compensation described above will not be made so that misreading tends to occur. In addition, the photoelectric effect element generally senses the brightness of a spot or portion outside of the marking positions on the recording medium which tends to be contaminated very often, so that the satisfactory compensation described above is not attained. To overcome this problem, at least two photoelectric effect elements may be provided for sensing the brightness of the surface of the recording medium at at least two different portions or spots; but this arrangement will make the card or tape readers complicated in construction.

It is therefore an object of the present invention to provide an improved system of reading out information upon a recording medium in an optical information reader which may substantially overcome the problems described above.

SUMMARY OF THE INVENTION

In brief, the present invention provides a system of reading out information for an optical information reader in which at least two of the photoelectric effect elements for reading the marked or unmarked information of the marking positions on the recording medium are used as means for sensing the brightness of the surface of the recording medium. These photoelectric effect elements are so selected that at least one of them always senses an unmarked bit location (corresponding to a not-punched location in a punched card). More particularly, at least one photoelectric effect element picks up a signal representative of the brightness of the surface of the recording medium. Therefore, the present invention may eliminate the additional photoelectric effect element in the prior art system for sensing the brightness of the surface of the recording medium. In addition, the system in accordance with the present invention directly senses the brightness of the surface of the recording medium where the information is marked, so that the compensation of the signals representative of the marked or unmarked information may be satisfactorily made.

According to one aspect of the present invention, the marked or unmarked information of the marking positions on the recording medium is converted into the electrical signals by a plurality of photoelectric effect elements arrayed to correspond to the marking positions in the column or row on the recording medium. The electrical signals are applied to respective logarithmic amplifiers to be converted into signals which logarithmically represent the outputs of the photoelectric effect elements. The outputs of the logarithmic amplifiers are applied to one input terminal of difference amplifiers. Depending upon the coding system, at least two marking locations including at least one of which is not marked are selected and the two photoelectric effect elements corresponding to this two marking locations are connected to a maximum voltage detector adapted to select, as an output, the higher output of the two outputs from the two photoelectric effect elements so that the electrical signal representative of the brightness of the surface of the recording medium may be always obtained and applied to the other input terminals of the difference amplifiers. Therefore, the electrical signals representative of the marked or unmarked information may be obtained accurately irrespective of the variation in brightness of the surface of the recording medium.

The present invention will be described in more detail with reference to the accompanying drawings.

DESCRIPTION OF THE PREFERRED EMBODIMENT

PRIOR ART

Figure 1:
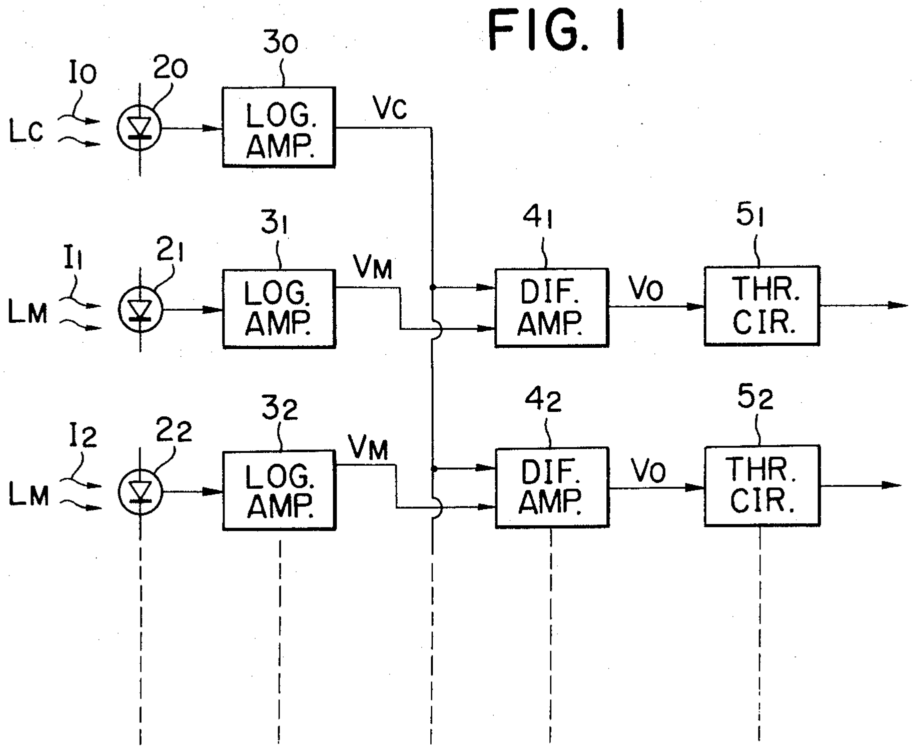
FIG. 1 is a block diagram of a prior art optical reader.

Referring to FIG. 1, only two photoelectric effect elements are shown for reading out the marked or unmarked information of the marking positions in the direction of the column or row thereof on a recording medium (not shown) and other photoelectric effect elements are not illustrated. However, in practice twelve photoelectric effect elements are arrayed in the direction of the column in order to read out or detect twelve marking positions in one column on the recording medium. The light $1_1$ and $1_2$ modulated by the marked information is intercepted by the photoelectric effect elements $2_1$ and $2_2$ and converted into the electrical signals to be applied to logarithmic amplifiers $3_1$ and $3_2$, respectively, so as to be converted into the electrical signals which logarithmically represent the outputs from the photoelectric effect elements $2_1$ and $2_2$.

The light $1_0$ from the recording medium is intercepted by a photoelectric effect element $2_0$ and is converted into the electrical signal, which is applied to a logarithmic amplifier $3_0$ to be converted into an electrical signal which logarithmically represents the output from the photoelectric effect element $2_0$.

It is assumed that the intensity of light modulated by the mark on the recording medium be $L_M$ and that of light reflected from the recording medium Lc. Then the electrical signal $V_M$ from the logarithmic amplifiers $3_1$ and $3_2$ and the electrical signal Vc from the logarithmic amplifier $3_0$ may be given by $$V_M = K_1 \log L_M \quad (1)$$

$$Vc = k_2 \log Lc \quad (2)$$

where $k_1$ and $k_2$ are proportionality constants and $k_1 = k_2 = k$ when the characteristics of the photoelectric effect elements $2_0$, $2_1$ and $2_2$ and the logarithmic amplifiers $3_0$, $3_1$ and $3_2$ are same.

The output from the logarithmic amplifier $3_1$ is applied to one input terminal of a difference amplifier $4_1$, whereas the output from the logarithmic amplifier $3_0$ is applied to the other input terminal of the difference amplifier $4_1$. In this case, the output Vo of the difference amplifier $4_1$ is given by:

$$Vo = A(Vc - V_M) = kA \log Lc/LM \quad (3)$$

where $A$ is an amplification factor of the difference amplifier $4_1$. As is evident from the Equation 3, when the light intensity of the light source illuminating the recording medium fluctuates, which affects $L_M$ and $Lc$, but the output signal of the differencial amplifier $4_1$ will not be affected by the change. Because both $L_M$ and $Lc$ will be affected equally by $k'$ - $k'L_M$ and $k'Lc$, so that $k'$ will be cancelled; consequently the output signal of the differencial amplifier cannot be affected. Here $k'$ is the rate of change of the light intensity. The output of a difference amplifier $4_2$ which is similar to the difference amplifier $4_1$ is also varied in the similar manner as described above, and the same is true for the outputs of other difference amplifiers not shown in FIG. 1. The outputs from the difference amplifiers $4_1$ and $4_2$ are reshaped by threshold circuits $5_1$ and $5_2$ respectively. The prior type reader described above has various problems.

THE INVENTION

Figure 2:
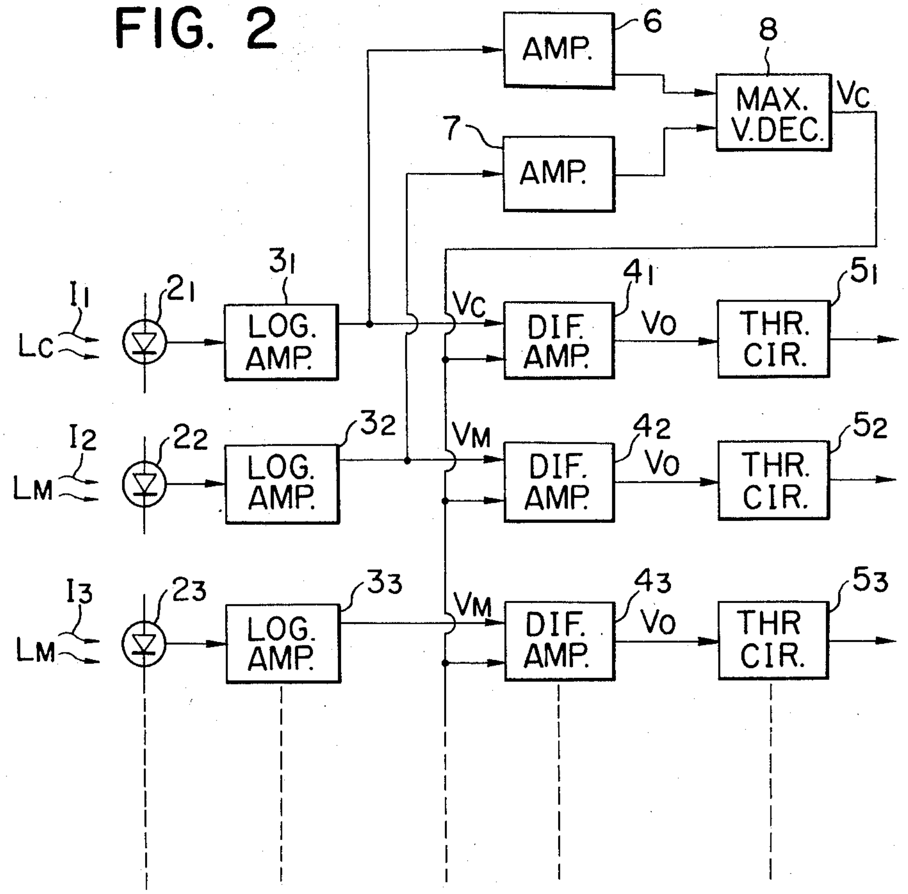
FIG. 2 is a block diagram of one preferred embodiment of the present invention.

Referring to FIG. 2 in which parts similar to those shown in FIG. 1 are indicated by same reference numerals, only three photoelectric effect elements $2_1$ –$2_3$ are shown and other elements are not shown for clarity. The light $1_1$, $1_2$ and $1_3$ reflected from the marks on a recording medium (not shown) is intercepted by the photoelectric effect elements $2_1$, $2_2$ and $2_3$ and the outputs from the photoelectric effect elements are applied one input terminals of the difference amplifiers $4_1$, $4_2$ and $4_3$ respectively through the logarithmic amplifiers $3_1$, $3_2$ and $3_3$. In this case it is noted that the output of either of the logarithmic amplifiers $3_1$ or $3_2$ must represent an "unmarked" information or position. More particularly, it is assumed that a marked position represents "1" whereas an unmarked position "0". Then either of the logarithmic amplifiers $3_1$ or $3_2$ produces an electrical signal repre-sentative of "0". The outputs from the logarithmic amplifiers $3_1$ and $3_2$ are applied to a maximum voltage detector 8 through amplifiers 6 and 7. The amplitude of the electrical signal representative of "0" is greater than that representing "1" because the light reflected from an unmarked position representing "0" is not modulated at all. Therefore the output of the maximum voltage detector 8 is the electrical signal representative of "0", that is the unmarked position in a column or row of the recording medium. The output of the maximum voltage detector 8 is applied to the other input terminals of the difference amplifiers $4_1$–$4_3$.

When the light representing an unmarked position or "0" having the intensity Lc is intercepted by the photoelectric effect element $2_1$, the output of the difference amplifier $4_1$ becomes zero. That is, "0" is read out. When the light representative of the marked positions or "1" having the intensity $L_M$ is intercepted by the photoelectric effect elements $2_2$ and $2_3$, the outputs from the difference amplifiers $4_2$ and $4_3$ are in proportion to log $Lc/L_M$. That is, "1" is read out. The outputs from the difference amplifiers $4_1$, $4_2$ and $4_3$ are not affected by the variation in brightness of light reflected from the recording medium because of the same reason described with reference to FIG. 1. The outputs from the difference amplifiers $4_1$, $4_2$ and $4_3$ are reshaped by the threshold circuits $5_1$, $5_2$, $5_3$ and transmitted to the output.

In the instant embodiment shown in FIG. 2, only two outputs from the two logarithmic amplifiers $\mathbf{3_1}$ and $\mathbf{3_2}$ are applied to the maximum voltage detector 8 through the amplifiers 6 and 7, but it is understood that more than two outputs from the logarithmic amplifiers may be applied to the detector 8 so that the intensity of light reflected from various marking positions of the recording medium may be detected thereby improving the read out accuracy.

What is claimed is:

1. A system for reading out information upon a recording medium in an optical information reader comprising a. a plurality of photoelectric effect elements arrayed so as to correspond to marking positions in a column or row on a recording medium for detecting coded marks thereon and producing first output signals, b. a plurality of logarithmic amplifiers for converting the first output signal from each of said photoelectric effect elements into a second output signal which logarithmically represents said first output of said each photoelectric effect element, c. first means for selecting at least two outputs from said plurality of logarithmic amplifiers and deriving from said selected outputs of said logarithmic amplifiers an electrical output signal representative of the brightness of said recording medium, and d. second means for deriving an electrical signal representative of the difference between the second output from each of said logarithmic amplifiers and the output of said first means, said selected second outputs from said logarithmic amplifiers including at least one output representative of the brightness of said recording medium.

2. The system as claimed in claim 1 wherein said first means comprises a maximum voltage detector responsive to the highest voltage of said selected second outputs from said logarithmic amplifiers, and said second means comprise a plurality of difference amplifiers.

3. The system as claimed in claim 2, comprising a plurality of threshold circuits, respective ones of said threshold circuits connected to respective ones of said plurality of difference amplifiers.

* * * * *